No. 886,465. PATENTED MAY 5, 1908.
J. ASTROM.
CONDENSING APPARATUS.
APPLICATION FILED SEPT. 27, 1906.
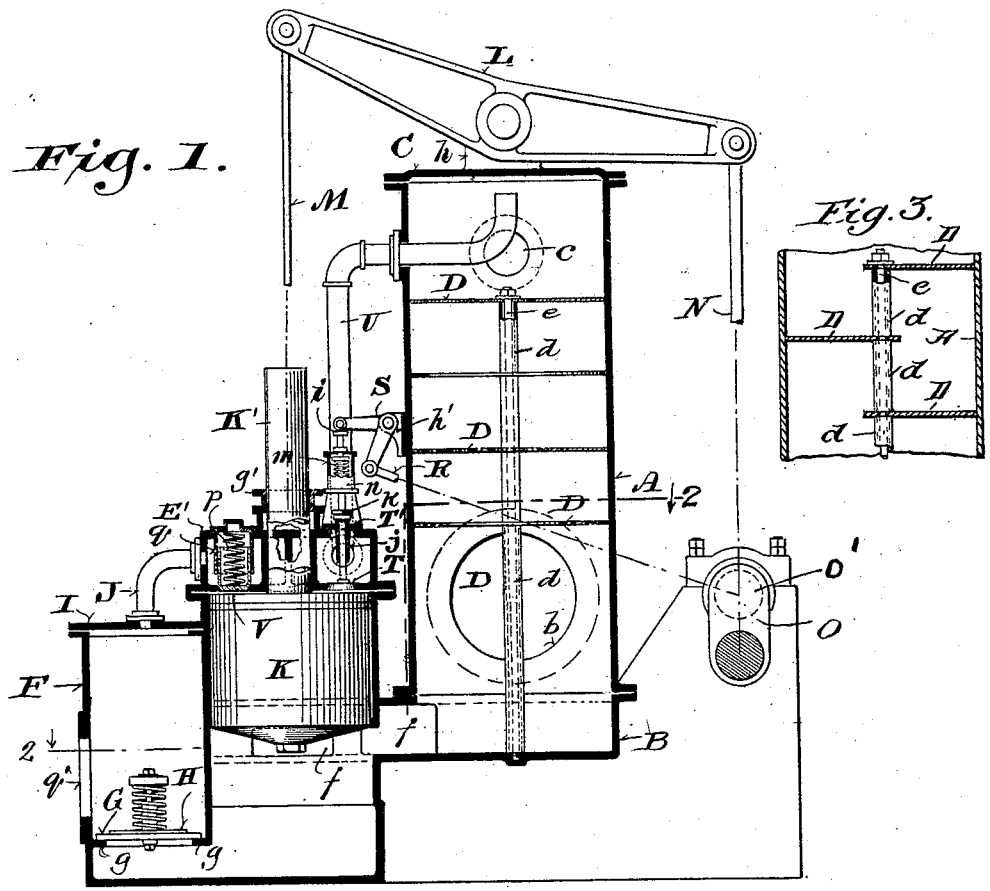
Fig. 1.
Fig. 3.
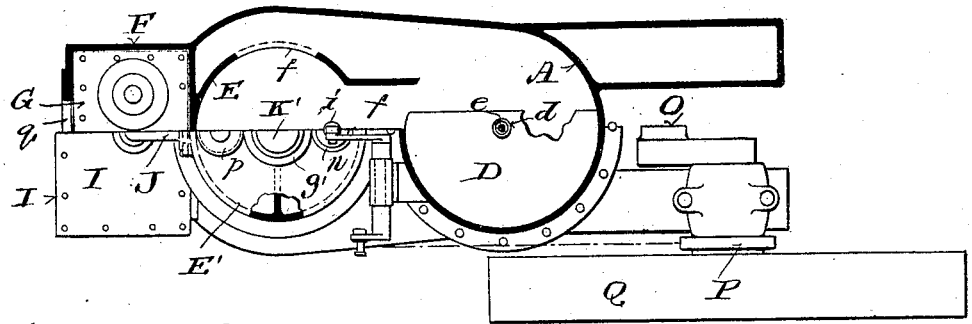
Fig. 2.
Witnesses:
Fred Palm
George Felber
Inventor:
John Astrom
By Oliphant & Young
Attorneys

UNITED STATES PATENT OFFICE.

JOHN ASTROM, OF MILWAUKEE, WISCONSIN.

CONDENSING APPARATUS.

No. 886,465.　　　Specification of Letters Patent.　　Patented May 5, 1908.

Application filed September 27, 1906. Serial No. 336,416.

*To all whom it may concern:*

Be it known that I, JOHN ASTROM, a citizen of the United States, and resident of Milwaukee, in the county of Milwaukee and State of Wisconsin, have invented certain new and useful Improvements in Condensing Apparatus; and I do hereby declare that the following is a full, clear, and exact description thereof.

The invention consists in what is herein shown, described and claimed; its object being to provide simple, economical and efficient condensing apparatus in which an overflow-pump and a dry-air pump are combined.

Figure 1 of the drawings represents a vertical central section of a condensing-apparatus in accordance with my invention, Fig. 2, a plan view of the same partly in horizontal section, the section being indicated by lines 2—2 in Fig. 1, and Fig. 3, a partly sectional view of a detail of the apparatus.

Referring by letter to the drawings, A indicates a condensing-chamber provided with an inlet-opening $b$ for the steam to be condensed, and another inlet-opening $c$ for injection water. The chamber is supported in air-tight flange-joint connection with a basin portion B of a hollow pump-casting, and a cover C has similar connection with said chamber. Within the chamber A are baffle-plates D mounted on spacing-sleeves $d$ engaging a rod $e$ arranged central of said chamber in connection with the aforesaid basin, these baffle-plates being extended alternately in opposite directions, as shown in Fig. 3, and as is common in the art. The pump-casting comprises a pump-cylinder E closed at the top (by a hollow valve-head E' hereinafter more particularly described) and open at the bottom, said cylinder, at a suitable height being provided with ports $f$ through which communication is had with the basin portion B of said casting. This casting also comprises an overflow chamber F adjacent to the pump-cylinder on that side of same furthest from the condensing-chamber A, and bolted or otherwise suitably secured, on flanges $g$, within the overflow-chamber, at the lower end of same, is a plate G having openings therein controlled by preferably spring-loaded check-valves H that open to permit flow of water-under-pressure from said pump-cylinder into said overflow-chamber. The outlet of the overflow-chamber is above the valve-plate G therein, and a cover I has air-tight flange-joint connection with said chamber.

Shown in connection with the pump-head E' and cover I of the overflow-chamber is a pipe J, but this pipe being one of the outlets of said pump-head its place of discharge is immaterial. The pump-head E' is partitioned to divide the same into inlet and outlet compartments having valve controlled bottom-openings through which communication with the pump-cylinder is established, the pipe J aforesaid being in connection with the outlet compartment. The central portion of the pump-head constitutes a guide and stuffing-box for the preferably hollow rod K' of a solid elongated piston K that is reciprocative in the pump-cylinder to alternately open and close communication, through the ports $f$ between the basin B of the pump-casting and said cylinder, a gland $g'$ being provided in connection with the stuffing-box and suitable packing employed in connection with the piston.

In oscillative connection with brackets $h$ on the cover C of the condensing-chamber A is a beam L, and a connecting-rod M is joined to the aforesaid piston rod and one end of the beam. Another connecting-rod N is joined to the other end of said beam and to a crank O of a shaft O' for which extensions of the pump-casting are provided with bearings. This shaft is shown provided with an eccentric P and drive-pulley Q, and connected to the eccentric, by a rod R, is one arm of a bell-crank lever S fulcrumed in connection with a bracket $h'$ attached to the condensing-chamber. The other arm of the bell-crank is opposed to a head $i$ of the stem T' of a valve T that controls the opening leading from the inlet-compartment of the aforesaid pump-head. The valve-stem is guided in a stuffing-box $j$ and gland $k$, and the valve itself is automatically seated and thus held in normal position, by the expansive force of a spring $m$ for which a casing $n$ is provided in connection with the pump-head, said valve being opened, at predetermined recurring intervals of time, by action of the bell-crank lever S against spring-resistance. However, instead of the spring-controlled reciprocative valve T, an ordinary check-valve may be employed, and any suitable mechanism may be utilized to actuate the pump-piston, as well as said reciprocative valve, if the latter be a part of the condensing apparatus.

Extending from within the condensing-chamber, near its cover, is a pipe U in communication with the inlet-compartment of the pump-head, and the opening leading from the pump-cylinder into the outlet-compartment of said head is shown controlled by a spring-loaded hollow valve V that opens upward, the spring p being incased by said valve and a guide q for same in connection with the aforesaid head, but it is practical to substitute an ordinary check-valve for the one V aforesaid.

In practice the steam to be condensed enters the chamber A through the inlet-opening b of same and ascends between the baffle-plates D, meeting a current of injection-water entering said chamber through the inlet opening c thereof and descending over said plates. The steam is thus rapidly condensed and the result tends toward the formation of a vacuum in the condensing-chamber. The water of condensation and the injection-water accumulates in the basin B of the pump-casting, and the pump-piston K being in position to uncover the ports f, the water aforesaid has gravity-flow from said basin into the pump-cylinder. When the piston descends far enough to close said ports, the water in the pump is shut off from the condensing-chamber, and as said piston continues on down-stroke, said water in the pump is displaced and forced through valve-controlled openings of the plate G into the overflow-chamber F from which it escapes through the outlet q' of same. Coincident with the above described operations, the valve T is unseated and any air that has entered the condensing-chamber, with the steam or injection-water, or by possible leakage, is drawn through the pipe U and inlet-compartment of the pump-head into the upper portion of the pump-cylinder. On up-stroke of the piston K, the air drawn into the pump-cylinder has its escape through the pump-head opening that is controlled by the valve V and finally escapes through the pipe J into the overflow-chamber F or elsewhere.

It is a recognized fact that in order to obtain the highest efficiency in a condensing apparatus for steam, the accumulated air must be removed from the condensing-chamber separately from the water-of-condensation, and the combined dry-air pump and overflow-pump above described accomplishes the desired result in a simple economical manner.

I claim:

1. The combination with a condensing-chamber for steam, of a combined couble acting dry-air and overflow water-pump consisting of a cylinder, and an elongated solid piston having sliding fit and reciprocation in the cylinder, which cylinder has communication at one end with the upper air-containing portion of the condensing-chamber from which air therein is exhausted by suction on the part of the piston moving in one direction, the opposite end of the aforesaid cylinder having piston-controlled communication with the lower water-containing portion of said chamber and open thereto for a time when said piston is on stroke in the direction opposite that aforesaid, whereby said air and water are separately removed from the aforesaid chamber by the same pump without commingling therein.

2. The combination with a condensing-chamber for steam, of a combined double-acting dry-air pump and an overflow-pump consisting of a cylinder, and a solid piston having sliding fit and reciprocation in the cylinder which cylinder has valve-controlled suction-connection at one end with the upper part of the condensing-chamber containing the accumulated air, the opposite end of said cylinder being in communication with the lower part of said chamber controlled by said piston acting intermittently as a cut-off on stroke to displace accumulated water, the two outlets of the aforesaid chamber being at all times separated by the aforesaid piston.

3. The combination with a condensing-chamber for steam, of a combined double-acting dry-air pump and overflow water-pump consisting of a cylinder, and a solid piston having sliding fit and reciprocation in the cylinder whereby said cylinder is divided into two compartments one of which has communication with the upper air-containing portion of the condensing-chamber to permit suction of air therefrom by a movement of the piston in one direction, the other compartment having piston-controlled communication with the lower water-containing portion of said chamber from which accumulated water is extracted when said piston is on stroke in the direction opposite that aforesaid, said air and water being always separated in the pump.

4. The combination with a condensing-chamber for steam, of a combined double-acting dry-air and overflow water-pump consisting of a cylinder in communication with opposite ends of said chamber, and a piston reciprocative in the cylinder to separately remove accumulated air and water from the aforesaid chamber without commingling of said air and water in said pump, the water inlet to said cylinder from the chamber being piston-controlled.

5. The combination of a condensing-chamber, a pump having communication with the chamber controlled by the pump-piston acting as a cut-off to intermittently prevent flow of water from the lower portion of said chamber to the pump-cylinder, a partitioned head on the pump having one compartment thereof in pipe-connection with the upper portion of the aforesaid chamber, the other compartment of the pump-head being provided with an air-outlet; and valves controlling openings by which communication is established between said pump-cylinder and head.

6. The combination of a condensing-chamber, a pump having communication with the lower portion of the chamber controlled by the pump-piston acting as a cut-off to intermittently prevent flow of water from said chamber to the pump-cylinder, said piston serving when on stroke in the opposite direction to expel water accumulated in said cylinder; a valve-controlled air-conduit from the upper portion of said chamber to the pump, and a valve-controlled air-outlet from said pump above the piston of same, which piston prevents commingling of air and water in said pump.

7. The combination of a condensing-chamber, a basin supporting the same, a pump having the lower portion of its cylinder in communication with the basin for a time when the pump-piston is on stroke in one direction, said piston serving when on stroke in the opposite direction to expel water accumulated in said cylinder; a valve-controlled air-conduit from the upper portion of said chamber to the pump, and a valve-controlled air-outlet from said pump above the piston of same.

8. The combination of a condensing-chamber, a pump having communication with the lower portion of the chamber controlled by the pump-piston acting as a cut-off to intermittently prevent flow of water from said chamber to the pump-cylinder, a valve-controlled overflow-chamber into which water accumulated in the pump is displaced, a valve-controlled air-conduit from the upper portion of the aforesaid chamber to the pump, and a valve-controlled air-outlet from said pump above the piston of same into the overflow-chamber.

9. The combination of a condensing-chamber with a pump having communication with the lower portion of the chamber controlled by the pump-piston acting as a cut-off to intermittently prevent flow of water from said chamber to the pump-cylinder, an air-conduit from the upper portion of the aforesaid chamber to the pump, a conduit controlling valve, mechanism for actuating the valve in synchrony with the reciprocation of said pump-piston, and a valve-controlled air-outlet from said pump above the piston of same.

In testimony that I claim the foregoing I have hereunto set my hand at Milwaukee in the county of Milwaukee and State of Wisconsin in the presence of two witnesses.

JOHN ASTROM.

Witnesses:
N. E. OLIPHANT,
GEORGE FELBER.